United States Patent
Kuroiwa (10) Patent No.: US 7,453,495 B2
(45) Date of Patent: Nov. 18, 2008

(54) ELECTRONIC CAMERA FOR DISPLAYING A PREVIEW IMAGE DURING STILL IMAGE CAPTURE

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/806,830

(22) Filed: Jun. 4, 2007

(65) Prior Publication Data
US 2007/0273773 A1 Nov. 29, 2007

Related U.S. Application Data (63) Continuation of application No. 10/344,125, filed as application No. PCT/JP01/06297 on Jul. 19, 2001, now abandoned.

(30) Foreign Application Priority Data

Aug. 9, 2000 (JP) .............................. 2000-241038

(51) Int. Cl.
*H04N 5/225* (2006.01)
*H04N 5/222* (2006.01)

(52) U.S. Cl. .............................. 348/220.1; 348/333.05

(58) Field of Classification Search ............ 348/333.02, 348/333.05, 333.11, 333.12, 220.1
See application file for complete search history.

(56) References Cited

U.S. PATENT DOCUMENTS

| 5,808,681 | A | 9/1998 | Kitajima |
| 6,018,363 | A | 1/2000 | Horii |
| 6,359,649 | B1 | 3/2002 | Suzuki |
| 6,683,642 | B1 | 1/2004 | Kobayashi et al. |
| 6,920,180 | B1 | 7/2005 | Yamane et al. |
| 2003/0090585 | A1 | 5/2003 | Anderson et al. |

FOREIGN PATENT DOCUMENTS

| JP | A 7-298111 | 11/1995 |
| JP | A 9-214836 | 8/1997 |
| JP | A-11-136565 | 5/1999 |

(Continued)

OTHER PUBLICATIONS

Shigeyuki Okada et al., "System on a chip for Digital Still Camera", TUPM 6.3, IEEE pp. 86 and 87 (1999).

*Primary Examiner*—David Ometz
*Assistant Examiner*—Dillon Durnford-Geszvain
(74) *Attorney, Agent, or Firm*—Oliff & Berridge, PLC (57) ABSTRACT

An electronic camera of the present invention includes an image pickup part performing "still image pickup generating a still image signal" and "control image pickup successively generating control image signals having higher frame rate" in time division; a still image processing part applying predetermined still image signal processing to the still image signal; a control image processing part applying predetermined control signal processing to the control image signals to extract control data; and a control part performing at least one control operation out of exposure control, focus control, and white balance control, based on the control data output from the control image processing part. Particularly, in the present invention, the control image processing part and the still image processing part are configured to operate independently. The control image processing part performs the signal processing on the control image signals successively generated, even when the still image signal is being signal-processed.

6 Claims, 5 Drawing Sheets

FOREIGN PATENT DOCUMENTS

| | | |
|---|---|---|
| JP | A 11-355665 | 12/1999 |
| JP | A 2000-69418 | 3/2000 |
| JP | A 2000-134550 | 5/2000 |
| JP | A 2000-350071 | 12/2000 |
| JP | A 2001-61094 | 3/2001 |
| JP | A 2001-128036 | 5/2001 |
| WO | WO 99/63484 | 12/1999 |

ELECTRONIC CAMERA FOR DISPLAYING A PREVIEW IMAGE DURING STILL IMAGE CAPTURE

This is a Continuation of U.S. patent application Ser. No. 10/344,125 filed on Feb. 7, 2003, which is a National Stage of PCT/JP01/06297 filed Jul. 19, 2001 that claims priority to Japanese Application No. 2000-241038 filed Aug. 9, 2000. The entire disclosures of the prior applications are hereby incorporated by reference in their entirety.

FIELD OF THE INVENTION

The present invention relates to an electronic camera which performs still image pickup and monitor image pickup (or control image pickup) of high frame rate in time division.

DESCRIPTION OF THE BACKGROUND ART

Conventionally, there have been known electronic cameras that pick up monitor images at high frame rate and, in response to a release operation by a photographer, perform still image pickup at high resolution.

By the way, electronic cameras of this kind typically perform signal processing on a still image (such as tone conversion, color interpolation, and image compression) with priority, immediately after a still image is picked up.

When still image processing is thus performed by priority, the time before checking the monitor of the still image signal can be reduced as much as possible. In addition, image compression is started quickly to ease the memory size of the image data, so that there is an advantageous effect that there can be increase in the number of possible exposures when continuously shooting.

While performing such still image processing, however, it was a necessity to stop picking up the monitor image or stop processing the monitor signal. Because of that, there have been problems of the monitor display being interrupted, or control operations of electronic cameras that use monitor images (such as focus control) being interrupted.

Such interruptions have caused a time lag such that the focus control of the electronic camera is exercised again, producing the adverse effect of delaying the next monitor display and still image pickup. Recently in particular, the foregoing adverse effect has had a propensity to grow in influence because the processing time of still images is on the increase due to electronic cameras having higher resolutions.

DISCLOSURE OF THE INVENTION

In view of the foregoing problem, it is thus an object of the present invention to provide an electronic camera which performs signal processing on image signals of high frame rate picked up in succession, even when a still image is being signal-processed.

Hereinafter, the contents of claims of the present invention will be described item by item.

(1) An electronic camera of the present invention comprises an image pickup part, a still image processing part, a control image processing part, and a control part.

This image pickup part performs "still image pickup for shooting a subject image to generate a still image signal" and "control image pickup for successively generating control image signals having a frame rate higher than that of the still image signal" in time division.

Moreover, the still image processing part accepts the still image signal generated by the image pickup part and applies predetermined still image signal processing to this still image signal.

Furthermore, the control image processing part accepts the control image signals generated by the image pickup part and applies predetermined control signal processing to these control image signals to extract control data.

Besides, the control part accepts the control data output from the control image processing part and performs at least one control operation out of exposure control, focus control, and white balance control, based on this control data.

In particular, the present invention is characterized in that the control image processing part and the still image processing part mentioned above are configured to operate independently, and the control image processing part performs the signal processing on the control image signals successively generated, even when the still image signal is being signal-processed.

In such a configuration, the control image processing part can process the control image signals picked up in succession by the image pickup part so that the control data is extracted smoothly even when the still image signal is being processed.

As a result, the continuous extracting of the control data will not be needlessly interrupted, even in the course of processing the still image signal. Therefore, it becomes possible to obtain control data as continuously as possible, and the adverse effect, that control operations may be delayed because they follow discontinuous change in the control data, can be mended.

(2) Moreover, another electronic camera of the present invention comprises an image pickup part, a still image processing part, and a monitor-image processing part.

This image pickup part performs "still image pickup for shooting a subject image to generate a still image signal" and "monitor-image pickup for successively generating monitor-image signals having a frame rate higher than that of the still image signal" in time division.

Besides, the still image processing part accepts the still image signal generated by this image pickup part and applies predetermined still image signal processing to this still image signal.

Furthermore, the monitor-image processing part accepts the monitor-image signals generated by the image pickup part and applies predetermined monitor signal processing to these monitor-image signals.

In particular, the present invention is characterized in that the monitor-image processing part and the still image processing part are configured to operate independently, and the monitor-image processing part performs the signal processing on the monitor-image signals successively generated, even when the still image signal is being signal-processed.

In such a configuration, the monitor-image processing part can smoothly process the monitor-image signals picked up in succession by the image pickup part, even when the still image signal is being processed.

As a result, monitor images are displayed without uselessly being interrupted even in the course of processing the still image signal. The monitor images can thus be displayed as continuously as possible.

(3) Furthermore, another electronic camera of the present invention is the electronic camera as set forth in the foregoing section (2), comprising a control image processing part and a control part.

This control image processing part accepts the monitor-image signals generated by the image pickup part and applies predetermined control signal processing to these monitor-image signals to extract control data.

Besides, the control part accepts the control data output from the control image processing part and performs at least one control operation out of exposure control, focus control, and white balance control, based on this control data.

In particular, the present invention is characterized in that the control image processing part and the still image processing part are configured to operate independently, and the control image processing part performs the signal processing on the monitor-image signals successively generated, even when the still image signal is being signal-processed.

In such a configuration, "the extraction of the control data" and "the monitor signal processing" will not be needlessly interrupted, even in the course of processing the still image signal. Therefore, the adverse effect that subsequent monitor displays and control operations are delayed can be mended.

(4) Furthermore, another electronic camera of the present invention comprises an image pickup part, an image processing part, a control image processing part, and a control part.

This image pickup part performs "still image pickup for shooting a subject image to generate a still image signal" and "monitor-image pickup for successively generating monitor-image signals having a frame rate higher than that of the still image signal" in time division.

Moreover, the image processing part applies predetermined still image signal processing to the still image signal generated by the image pickup part and applies predetermined monitor signal processing to the monitor-image signals generated by the image pickup part.

Furthermore, the control image processing part applies predetermined control signal processing to the monitor-image signals generated by the image pickup part to extract control data.

Besides, the control part performs at least one control operation out of exposure control, focus control, and white balance control, based on the control data output from the control image processing part.

In particular, the present invention is characterized in that the control image processing part and the image processing part are configured to operate independently, and the control image processing part performs the signal processing on the control image signals successively generated, even when the still image signal is being signal-processed.

In such a configuration, the signal processing of the still image signal and the monitor-image signals is performed by the image processing part, which is a single unit. Therefore, it becomes possible to reduce the circuit scale of the apparatus as compared to the case where the still image processing part and the monitor-image processing part are provided independently. As a result, power consumption can easily be reduced, resulting in extending the battery life of the electronic camera.

Incidentally, in the foregoing configuration, the signal processing of the still image signal and that of the monitor-image signal cannot be perfectly synchronized. On that account, when the still image signal is processed with priority, updating the monitor display while the still image signal is being signal-processed becomes difficult. Nevertheless, even under these circumstances, the control image processing part can extract the control data from the monitor-image signals. Thus, although the monitor display cannot be updated, the continuity of the control data will not be needlessly interrupted and the control data can be obtained as continuously as possible. Consequently, it becomes possible to mend the adverse effect that control operations may be delayed because they follow discontinuous change in control data.

(5) Another electronic camera of the present invention is the electronic camera as set forth in the foregoing section (2) or the foregoing section (4), comprising a display part for displaying the still image signal and the monitor-image signals in a juxtaposed fashion, in a nested fashion, or in a selective fashion.

When images are displayed in a juxtaposed fashion, it becomes possible to determine the next composition based on the moving image display by the monitor-image signals and to check the monitor by the still image signal at the same time.

Moreover, when images are displayed in a nested fashion, the images displayed concurrently are more in a subordinate-superior relationship than in when they are displayed in a juxtaposed fashion. It is thus easier to recognize intuitively which image is which.

Furthermore, when images are displayed selectively, it becomes possible to check the desired image signal alone on the monitor.

(6) Another electronic camera of the present invention is the electronic camera as set forth in the foregoing section (5), wherein the display part has a first memory region for storing the still image signal for monitor display use and a second memory region for storing the monitor-image signals, the first and second memory regions being independent from each other, and switches the memory region to be displayed on a monitor to replace display on the monitor.

In such a configuration, the two memory regions are independent from each other. This makes it possible to replace the display on the monitor quickly by switching the memory region to be displayed on the monitor. This allows such operations as instantaneously replacing the positions of images to be displayed in a juxtaposed fashion and instantaneously switching a still image display with a monitor image.

Incidentally, the foregoing object and other objects of the present invention can be seen easily from the following description and the accompanying drawings.

BEST MODE FOR CARRYING OUT THE INVENTION

Hereinafter, embodiments of the present invention will be described with reference to the drawings.

First Embodiment

Configuration of First Embodiment

Figure 1:
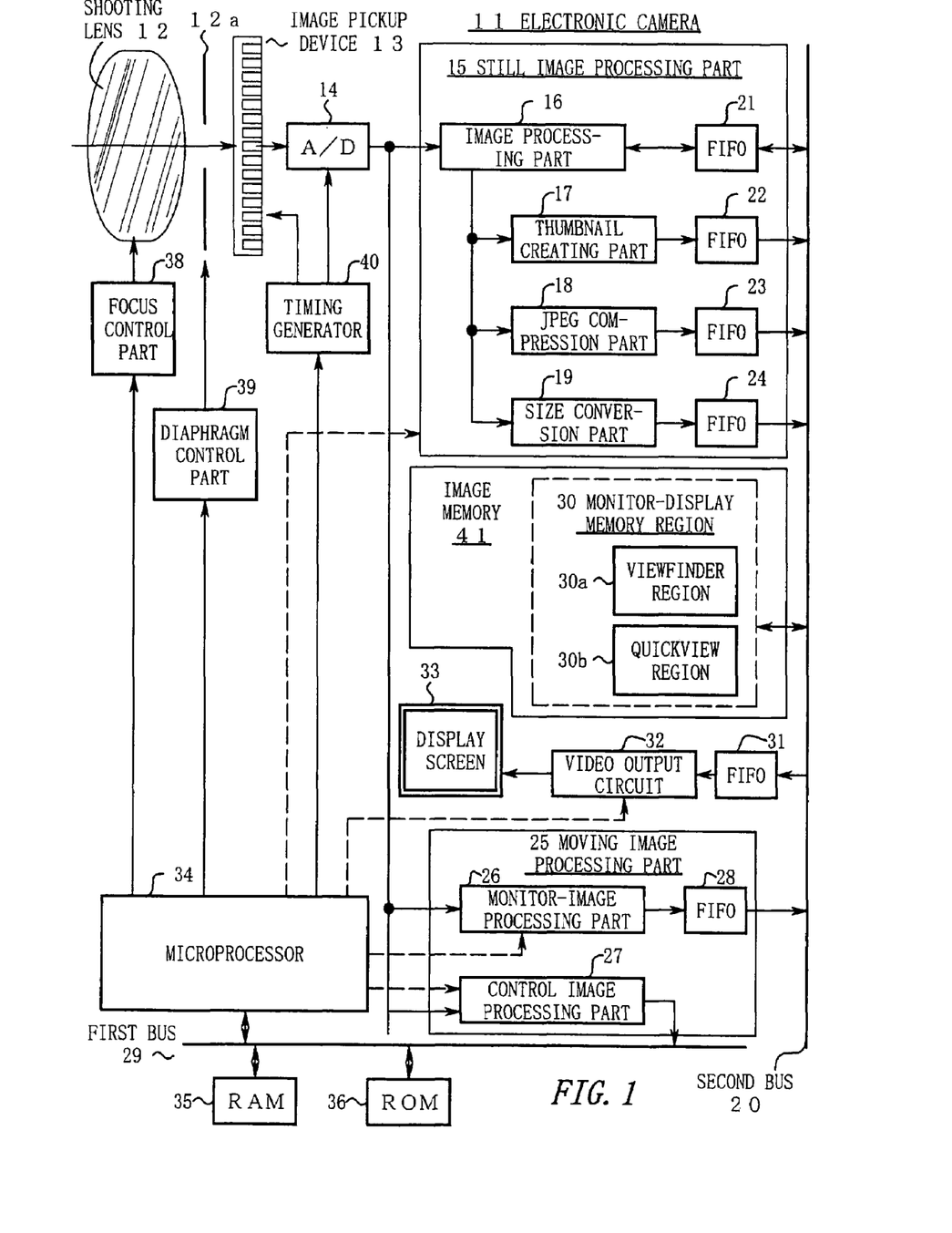
FIG. 1 is a diagram showing the configuration of an electronic camera 11 according to the first embodiment.

FIG. 1 is a diagram showing the configuration of an electronic camera 11.

Figure 2:
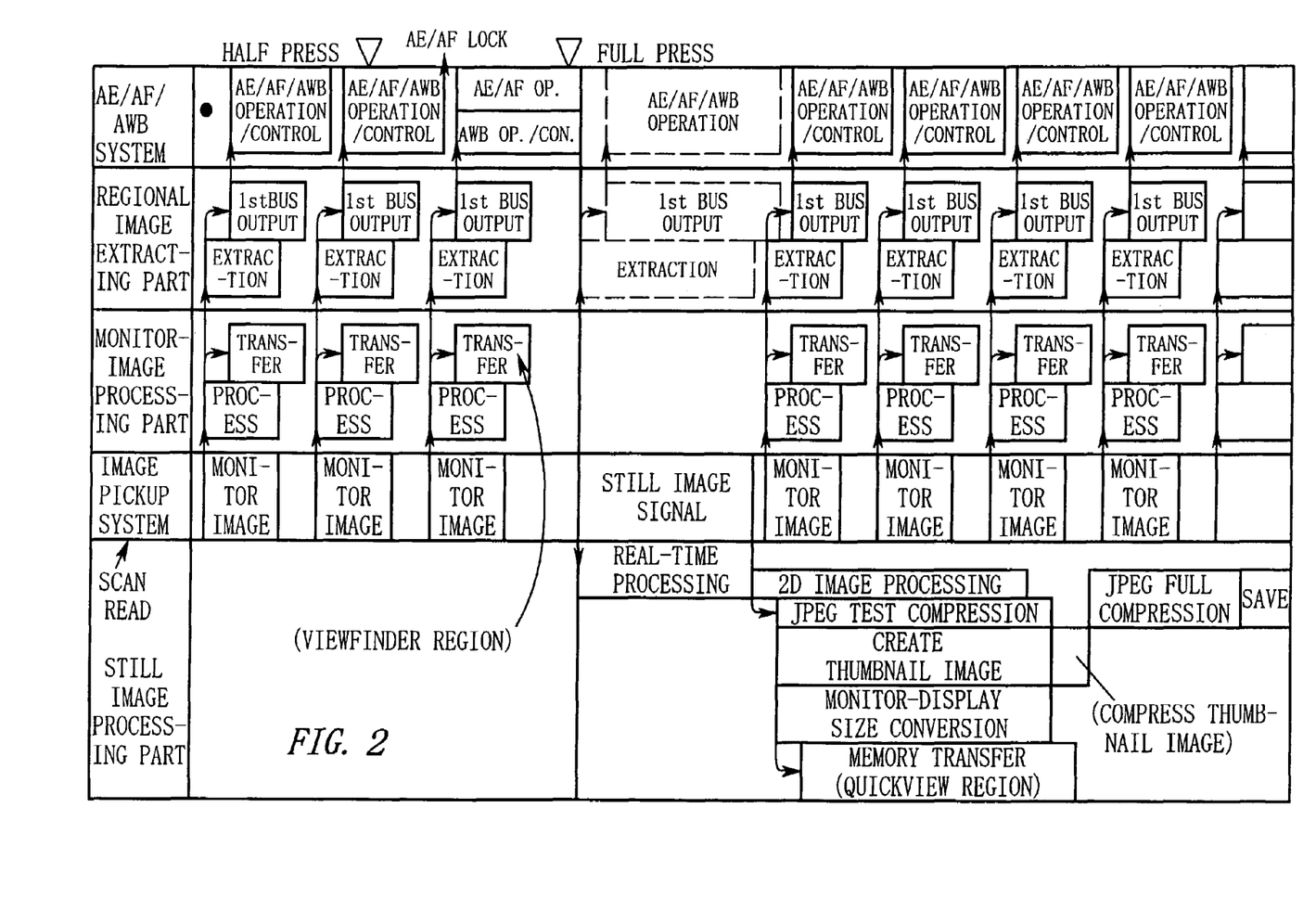
FIG. 2 is a timing chart for explaining the operation of the electronic camera 11.

FIG. 2 is a timing chart for explaining the operation of the electronic camera 11.

In FIG. 1, a shooting lens 12 is mounted on the electronic camera 11. The image pickup surface of an image pickup device 13 is situated on the optical axis of this shooting lens 12 via a diaphragm 12a. Incidentally, for the sake of avoiding smear in reading a still image signal after release, a mechanical shutter may be arranged in front of the image pickup surface of the image pickup device 13.

An image signal output from this image pickup device 13 is supplied to a still image processing part 15 and a moving image processing part 25 through an A/D conversion part 14.

This still image processing part 15 is composed of an image processing part 16 for performing a 2D image process, a thumbnail creating part 17 for creating thumbnails, a JPEG compression part 18 for performing JPEG compression, and a size conversion part 18 for converting image sizes for use in monitor display of still images. These processing parts 16-19 are connected to a second bus 20 which is used chiefly for image processing, through FIFO (First-In First-Out memories) 21-24, respectively.

Here, the image processing part 16 performs imperfect pixel correction, black level clamp, gain adjustment, white balance adjustment, tone conversion, color interpolation, color coordinate conversion, filtering, etc. Of these, a series of processes capable of real-time processing such as imperfect pixel correction, black level clamp, and gain adjustment is processed in real time as a first step. Here, white balance adjustment is executed as part of the real-time processing if white balance adjustment values are obtained in advance from monitor-image signals or the like. Tone conversion can also be executed as part of the real-time processing if it can be processed before color interpolation.

On the other hand, color interpolation and filtering are difficult to execute as part of the real-time processing since they are 2D image processes. Then, these 2D image processes are executed as a second step while data is exchanged with an image memory 41 to be described later.

Meanwhile, the moving image processing part 25 is composed of a monitor-image processing part 26 for performing signal processing on a monitor-image signal and a control image processing part 27 for extracting control data from predetermined regions of a monitor image. The output of this monitor-image processing part 26 is connected to the second bus 20 through a FIFO 28. Moreover, the output of the control image processing part 27 is connected to a first bus 29 which is used chiefly for system control.

The image memory 41 is also connected to the second bus 20. A monitor-display memory region 30 in the image memory 41 is provided with two memory regions (viewfinder region 30a, quickview region 30b) which are capable of independent accesses. Incidentally, this image memory 41 is also used as a work memory in performing signal processing.

Moreover, the second bus 20 is connected with a video output circuit 32 through a FIFO 31. This video output circuit 32 drives a display screen 33 to exercise image display.

Now, the first bus 29 is connected with a microprocessor 34 for performing system control, a RAM 35, a ROM 36, and so on. This microprocessor 34 is connected with the still image processing part 15, the monitor-image processing part 26, the control image processing part 27, the video output circuit 32, a focus control part 38 for performing a focus control on the shooting lens 12, a diaphragm control part 39 for controlling the diaphragm 12a, a timing generator 40 for controlling the image pickup device 13 and the A/D conversion part 14, and so on, in order that control signals for system control are transmitted thereto, respectively.

Incidentally, these control signals may be transmitted to the respective units through the first bus 29. Incidentally, when a mechanical shutter is provided, a control signal of the microprocessor 34 is also transmitted to a control unit of the mechanical shutter.

Correspondence Between the Foregoing Configuration and the Present Invention

Hereinafter, description will be given of the correspondence between the first embodiment and the present invention.

The image pickup part as set forth in claims corresponds to the image pickup device 13 and the timing generator 40.

The still image processing part as set forth in claims corresponds to the still image processing part 15.

The control image processing part as set forth in claims corresponds to the control image processing part 27.

The control part as set forth in claims corresponds to the microprocessor 34, the focus control part 38, the diaphragm control part 39, the timing generator 40, the monitor-image processing part 26 (a white balance adjustment function thereof), etc.

The control image signal as set forth in claims corresponds to the monitor-image signal.

The monitor-image processing part as set forth in claims corresponds to the monitor-image processing part 26.

The display part as set forth in claims corresponds to the monitor-display memory region 30 for and the video output circuit 32.

The first memory region as set forth in claims corresponds to the quickview region 30b.

The second memory region as set forth in claims corresponds to the viewfinder region 30a.

Next, characteristic operations of the first embodiment will be described individually.

Monitor-Image Signals Processing Operation

Initially, description will be given of the operation for processing monitor-image signals.

The timing generator 40 drives the image pickup device 13 to generate monitor-image signals in succession. These monitor-image signals are image signals of high frame rate, being generated by partially reading data that is generated pixel by pixel in the image pickup device 13. Incidentally, when the image pickup device 13 is a CCD, the monitor-image signals are often signals whose lines are partially skipped being read.

The monitor-image signals thus successively generated are digitized by the A/D conversion part 14 before supplied to both the monitor-image processing part 26 and the control image processing part 27.

The monitor-image processing part 26 performs signal processing for monitor display (such as color interpolation and tone conversion) on the monitor-image signals. Concurrently with this signal processing, the monitor-image processing part 26 transfers and records the processed monitor-image signals onto the viewfinder region 30a in the monitor-display memory region 30 arranged in the image memory 41 through the second bus 20. The video output circuit 32 reads the monitor-image signals from this viewfinder region 30a periodically, and displays the monitor-image signals on the display screen 33 as moving images.

Meanwhile, the control image processing part 27 extracts a regional image of a focus detection area, a regional image of a photometric area, and a regional image of a white balance area individually from the monitor-image signals. Incidentally, these areas can be changed freely by a control signal from the microprocessor 34. Moreover, unless there is a specific problem, these areas may be united to omit redundancy in the processing for extracting the regional images.

The control image processing part 27 performs operations on these regional images to extract control data (here, a contrast value, a photometric value, and a white balance value).

Concurrently with this extracting operation, the control image processing part 27 successively outputs the extracted control data to the microprocessor 34 through the first bus 29.

Here, the microprocessor 34 performs operations based on the control data of the contrast value to drive the focus control part 38, thereby exercising a focus control of contrast hill-climbing method.

The microprocessor 34 also performs an exposure operation based on the control data of the photometric value, thereby exercising an exposure control through the diaphragm control part 39 and the timing generator 40 (electronic shutter). Incidentally, at the time of the control image pickup (monitor-image pickup), the depth of focus of the shooting lens 12 is better rendered shallower to increase the detection sensitivity to focus errors (peaks in contrast value). Thus, the diaphragm 12a is preferably fixed to near release.

Moreover, the microprocessor 34 transmits the control data of the white balance adjustment value to the monitor-image processing part (or still image processing part) for the sake of a white balance adjustment.

The focus control and exposure control described above are locked after the release is half pressed. During this control lock, the shooting lens 12 is fixed to the focus position and the exposure control value is held by the microprocessor 34 in preparation for still image pickup by a full press of the release. Incidentally, as shown in FIG. 2, the image pickup operation of the monitor-image signals, the extraction processing of the control data, the white balance adjustment, the operation for a focus control, the operation for an exposure control, and the like continue being performed even after the half press.

By the sequential processing of the monitor-image signals described above, the control operation of the electronic camera 11 and the moving image display of the monitor-image signals continue being effected as shown in FIG. 2.

Still Image Signal Processing Operation

Next, description will be given of the operation for processing a still image signal.

When the release button of the electronic camera 11 is full pressed during the operation for processing monitor-image signals as described above, the microprocessor 34 controls the timing generator 40 to perform still image pickup (exposure) based on the exposure control value held at the time of the control lock (control of the diaphragm 12a and the electronic shutter), and then reads a still image signal from the image pickup device 13. This still image signal is an image signal of high resolution, being read from the image pickup device 13 with no partial reading.

The still image signal generated thus is digitized by the A/D conversion part 14 before supplied to the image processing part 16. The image processing part 16 performs, as described above, the real-time processing of the first step and the 2D image process of the second step on this still image signal.

Here, if a white balance adjustment is to be made to the still image signal by using the white balance adjustment value obtained in the immediately preceding control image pickup (monitor-image pickup), the microprocessor 34 sets this adjustment value to the image processing part 16 before the read of the still image signal so that the white balance adjustment is made in the process of the real-time processing.

The image processing part 16, each time it completes the 2D image process for a minimum unit of processing, supplies the still image signal past the 2D image process (YCbCr, RGB, or such an image signal) to the thumbnail creating part 17, the JPEG compression part 18, and the size conversion part 19 as needed.

The thumbnail creating part 17 creates a thumbnail image based on the still image signal supplied thus.

The JPEG compression part 18 performs JPEG test compression and JPEG full compression based on the still image signal (typically a YCbCr image signal) supplied thus, compressing the still image signal to a target code volume.

Incidentally, the JPEG compression part 18 also performs image compression of the thumbnail image during such JPEG compression.

The compressed image data and thumbnail compressed data processed thus are integrated into JPEG files and stored into a memory card (not shown).

Meanwhile, the size conversion part 19 performs size conversion for quickview (monitor check of the result of the image pickup) based on the still image signal supplied thus. Concurrently with such size conversion, the size conversion part 19 transfers and records the size-converted still image signal onto the quickview region 30b through the second bus 20. The video output circuit 32 reads the still image signal from this quickview region 30b, and makes a quickview display on the display screen 33.

Incidentally, when the output signal of the video output circuit 32 is a video signal of NTSC format, PAL format, or SECAM format, the size conversion part 19 is supplied with a YCbCr image signal.

By the processing of the still image signal described above, the still image signal is stored and a quickview display is effected as shown in FIG. 2.

Concerning Processing of Monitor-Image Signals During Signal Processing of Still Image Signal Next, description will be given of the processing of monitor-image signals during the signal processing of a still image signal described above.

Initially, as shown in FIG. 2, the timing generator 40 restarts the successive generation of monitor-image signals immediately after the completion of read of the still image signal. Here, the still image processing part 15 has started the signal processing on the still image signal.

The control image processing part 27 restarts the operation of extracting control data from monitor-image signals immediately without hampering the operation of this still image processing part 15 at all.

In addition, the monitor-image processing part 26 restarts the monitor signal processing immediately without hampering the operation of this still image processing part 15 at all.

Concerning Monitor Display Replacing Operation

Figure 3:
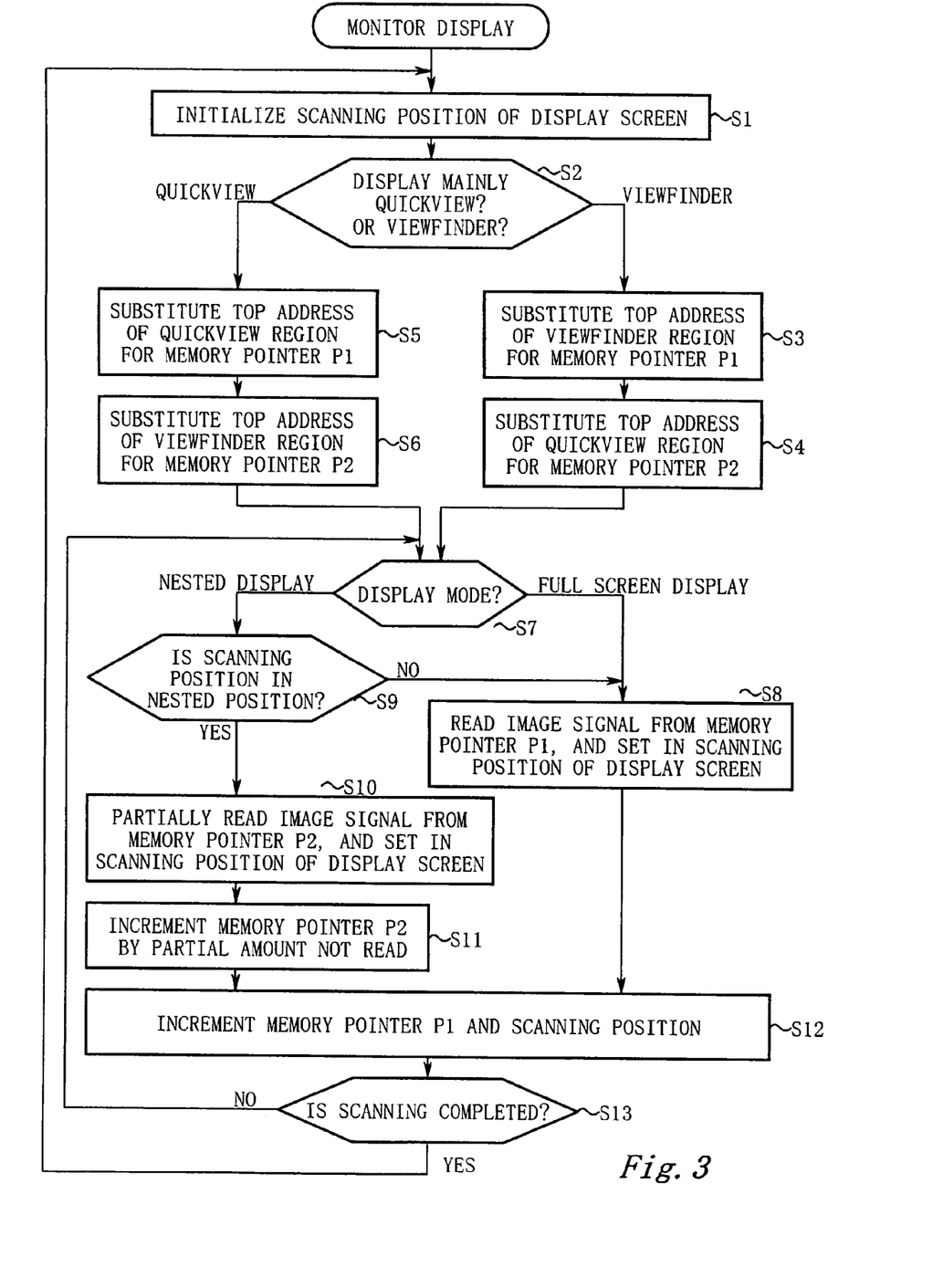
FIG. 3 is a flowchart for explaining the operation of a video output circuit 32.
Figure 4:
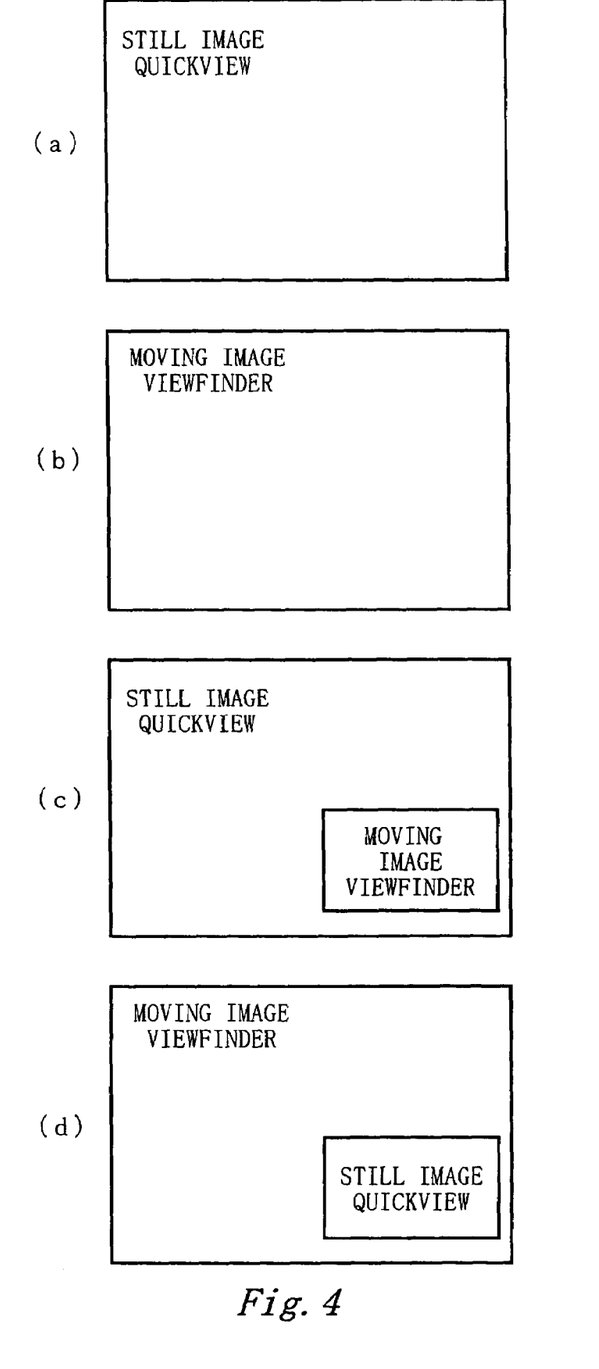
FIG. 4 is a diagram showing display examples of a display screen 33.

FIG. 3 is a flowchart for explaining the operation of the video output circuit 32.

Hereinafter, the operation for replacing monitor display will be described with reference to the step numbers shown in FIG. 3.

Step S1: Initially, the video output circuit 32 sets the scanning position of the display screen 33 to an initial position (such as the upper left of the screen).

Step S2: The video output circuit 32 determines which screen to display mainly (hereinafter, referred to as "main screen") in accordance with internal flag information.

Here, when the viewfinder is the main screen, the video output circuit 32 moves to step S3 in operation. On the other hand, when the quickview is the main screen, the video output circuit 32 moves to step S5 in operation. Incidentally, the microprocessor 34 can rewrite the flag information in this video output circuit 32 to change the screen to display mainly as needed.

Step S3: Here, the viewfinder is selected as the main screen. Then, the video output circuit 32 substitutes the top address of the viewfinder region 30a, the main screen, for a memory pointer P1.

Step S4: Moreover, the video output circuit 32 substitutes the top address of the quickview region 30b for another memory pointer P2. After the completion of such pointer setting, the video output circuit 32 moves to step S7 in operation.

Step S5: Here, the quickview is selected as the main screen. Then, the video output circuit 32 substitutes the top address of the quickview region 30b, the main screen, for the memory pointer P1.

Step S6: Moreover, the video output circuit 32 substitutes the top address of the viewfinder region 30a for the other memory pointer P2. After the completion of such pointer setting, the video output circuit 32 moves to step S7 in operation.

Step S7: The video output circuit 32 selects the display mode of the screen in accordance with internal flag information. Here, when a full screen display is selected as the display mode, the video output circuit 32 moves to step S8 in operation. On the other hand, when a nested display is selected, the video output circuit 32 moves to step S9 in operation. Incidentally, the microprocessor 34 can rewrite the flag information in this video output circuit 32 to change the display mode as needed.

Step S8: The video output circuit 32 reads an image signal from the memory pointer P1 and sets the signal value in the scanning position of the display screen 33. After such setting, the video output circuit 32 moves to step S12 in operation.

Step S9: Since the nested display is selected here, the video output circuit 32 determines whether or not the current scanning position corresponds to the nested screen.

When the current scanning position does not correspond to the nested screen, the video output circuit 32 moves to step S8 in operation to perform the same operation as with full screen display.

On the other hand, when the current scanning position corresponds to the nested screen, the video output circuit 32 moves to step S10 in operation to perform the processing of the nested screen.

Step S10: To perform the processing of the nested screen here, the video output circuit 32 partially reads an image signal from the memory pointer P2, and sets the signal value in the scanning position of the display screen 33.

Step S11: The video output circuit 32 increments the memory pointer P2 by the partial amount not read, in preparation for the next pointer reference.

Step S12: The video output circuit 32 increments the memory pointer P1 and the scanning position in preparation for the next pointer reference.

Step S13: Here, the video output circuit 32 determines whether the scanning is completed or not. If the scanning is not completed, the video output circuit 32 returns to step S7 in operation to continue scanning the display screen 33. On the other hand, if the scanning is completed, the video output circuit 32 returns to step S5 in operation to repeat the scanning of the display screen 33 from the initial position.

Effects, Etc. of the First Embodiment

As described above, in the first embodiment, the generation of a monitor-image signal is restarted immediately after the generation of a still image signal as shown in FIG. 2. In response to this monitor-image signal, the control image processing part 27 restarts the operation for extracting control data immediately. Consequently, the control data has high continuity, which can effectively preclude the problem that a discontinuous change in the control data causes a delay in subsequent control operations.

Besides, in the first embodiment, the monitor-image processing part 26 performs the processing of monitor-image signals even while a still image signal is processed. It is therefore possible to display the monitor-image signals even during the still image signal processing.

Moreover, in the first embodiment, the operation of the video output circuit 32 described above makes it possible to display four types of screens shown in FIG. 4(a)-(d) on the display screen 33. In this case, the microprocessor 34 can rewrite the flag information in the video output circuit 32 to switch these four types of screens instantaneously.

In particular, the first embodiment comprises the second bus 20 for exchanging still image signals and the first bus 29 for exchanging control data, the buses being independent of each other. This precludes the still image signals and the control data from conflicting on an identical bus, and makes it possible to perform the still image processing and the control operations smoothly in parallel.

Furthermore, in the first embodiment, the image pickup operation of the monitor-image signals, the extraction processing of the control data, the white balance adjustment to the monitor images, the operation for a focus control, and the operation for an exposure control are continued even after the release is half pressed. The control data and the operations can thus be maintained at high continuity even after the half press. Consequently, it becomes possible to effectively preclude such adverse effects that the control operations delay restarting after the half-pressed state is cleared.

Now, description will be given of another embodiment.

Second Embodiment

Figure 5:
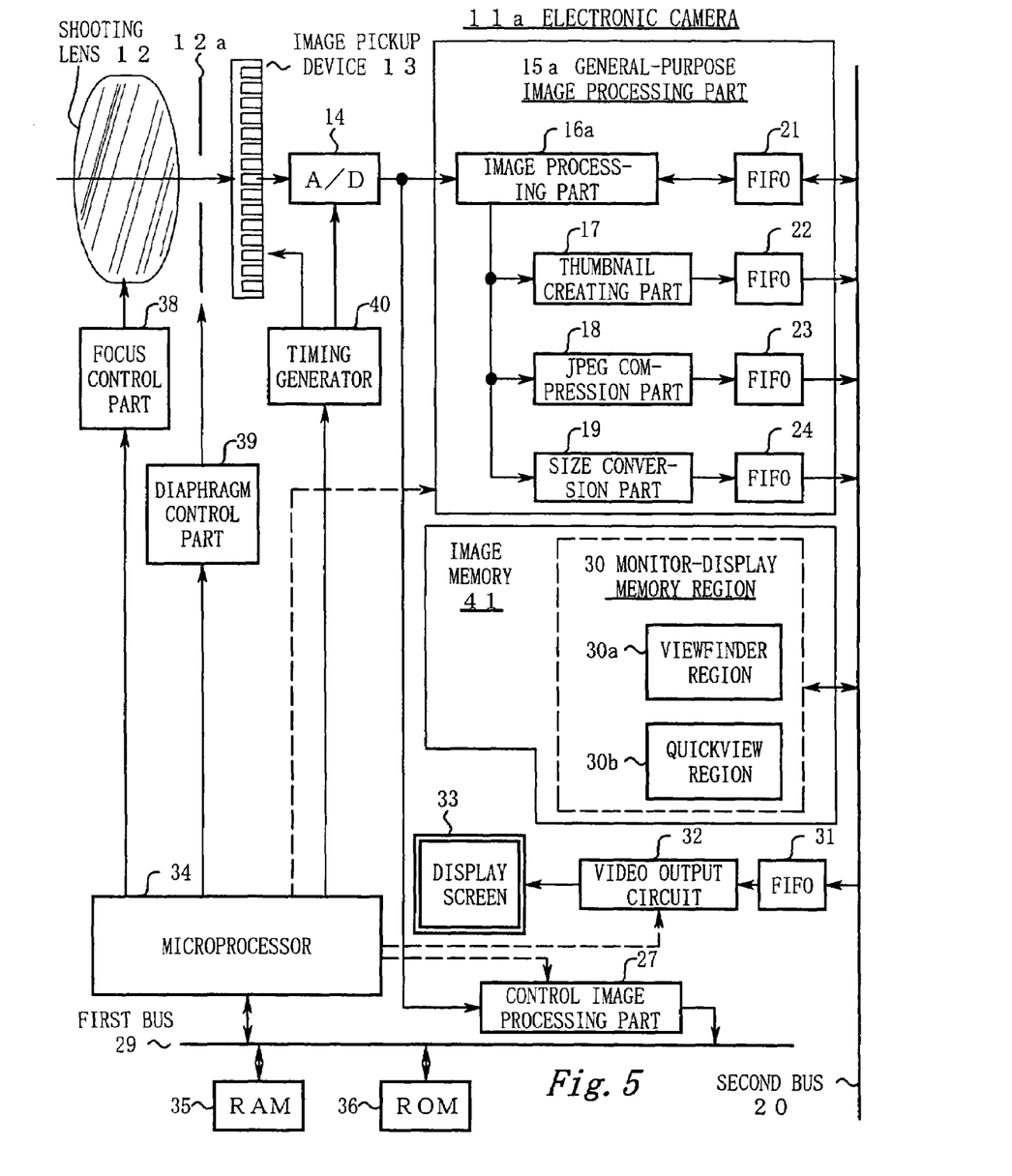
FIG. 5 is a diagram showing the configuration of an electronic camera 11a according to the second embodiment.

FIG. 5 is a diagram showing the configuration of an electronic camera 11a according to the second embodiment.

The configuration of the second embodiment is characterized in that the still image processing part 15, the monitor-image processing part 26, and the FIFO 28 are omitted from the electronic camera 11 described above (FIG. 1), and a general-purpose image processing part 15a is arranged instead.

This general-purpose image processing part 15a contains an image processing part 16a. This image processing part 16a performs still image signal processing or signal processing for a monitor image selectively depending on the type of the image signal (still image signal, monitor-image signal) designated by the microprocessor 34.

Incidentally, since the components and operations are otherwise the same as in the first embodiment, description thereof will be omitted here.

As above, according to the second embodiment, the signal processing circuits dedicated to monitor-image signals become unnecessary. This makes it possible to reduce the circuit scale of the entire electronic camera. As a result, the power consumption of the electronic camera can be lowered to extend the battery life of the electronic camera.

Moreover, since the control image processing part 27 extracts control data even during the signal processing of still image signals, the control data can be obtained as continuously as possible. This can improve the problem that a discontinuous change in the control data causes a delay in control operations.

Furthermore, in the second embodiment, the image processing part 16*a* for performing image processing for general purpose use and the JPEG compression part 18 and the like for performing signal processing dedicated to still image signals are configured capable of independent operations. The image processing part 16*a* can thus enter the signal processing of monitor-image signals quickly after the signal processing of a still image signal shifts to the JPEG compression part 18 and the like. As a result, it becomes possible to shorten the interruption of monitor display.

Supplemental Remarks on Embodiments

Incidentally, in the embodiments described above, regional images are cut out of the monitor-image signals, and control data (such as a contrast value, a photometric value, and a white balance value) is calculated from these regional images. However, the control data is not limited thereto. For example, the control image processing part 27 may cut regional images out of the monitor-image signals and transmit these regional images to the microprocessor 34 as the control data. In this case, the microprocessor 34 performs operations for a contrast value, a photometric value, a white balance value, etc. based on the regional images.

Moreover, in the foregoing embodiments, the control data is not extracted from the still image signal. However, this is not restrictive. For example, the control image processing part 27 may extract control data from the still image signal (see dotted portions shown in FIG. 2). In this case, the continuity of the control data can be enhanced further, allowing an additional improvement to the adverse effect that subsequent monitor display and still image pickup might get delayed due to a discontinuous change in the control data.

Incidentally, the foregoing embodiments have dealt with the cases where the video output circuit 32 makes a full screen display and a nested display. However, this is not restrictive. For example, the video output circuit 32 may arrange two screens on the display screen 33 for juxtaposed display.

Moreover, in the foregoing embodiments, the video output circuit 32 switches the memory pointers P1 and P2 in accordance with the scanning position of the screen. However, this is not restrictive. For example, image signals may be read from the two memory regions 30*a* and 30*b* in parallel (as concerns a nested screen, partial read shall be performed) so that the video output circuit 32 selects which image signal to display in accordance with the scanning position.

By the way, in the present invention, the control data has high continuity even during the signal processing of the still image signal. This improves the continuity of the focus control and the like. Consequently, the next release operation can be accepted easily even during the signal processing of the still image signal. In such a case, it is preferable to perform either of the following operations:

1) The still image processing part 15 continues the signal processing of the still image signal (2D image process in particular) and captures the released still image signal (at least temporarily records the same on the image memory) concurrently. Incidentally, the capture is preferably accompanied with the real-time processing.

2) The still image processing part 15 suspends the signal processing of the still image signal, captures the released still image signal (at least temporarily records the same on the image memory) as an interrupt, and restarts the suspended signal processing after the completion of the capture. Incidentally, the capture is preferably accompanied with the real-time processing.

These operations can reduce the possibility of missing the right moment for a valuable shot.

The invention may be embodied in other specific forms without departing from the spirit and essential characteristics thereof. The foregoing embodiments are therefore to be considered in all aspects as illustrative and not restrictive. The scope of the invention is indicated by the appended claims rather than by the foregoing description. All changes which come within the meaning and range of equivalency of the claims are therefore intended to be embraced therein.

What is claimed is:

1. An electronic camera comprising:

an image pickup part for performing still image pickup for shooting a subject image to generate a still image signal, and control image pickup for successively generating control image signals having a frame rate higher than that of the still image signal in time division;

a still image processing part for accepting the still image signal generated by the image pickup part and applying predetermined still image signal processing thereto;

a control image processing part for accepting the control image signals generated by the image pickup part and applying predetermined control signal processing thereto to extract control data;

a control part for accepting the control data output from the control image processing part and performing at least one control operation out of exposure control, focus control, and white balance control, based on the control data;

a first bus connected to the control image processing part, which transmits the control data; and a second bus connected to the still imaging processing part, which transmits the still image signal, wherein:

the control image processing part and the still image processing part are configured to operate independently via the first bus and the second bus, and the control image processing part performs the signal processing on the control image signals successively generated, even when the still image signal is being signal-processed.

2. An electronic camera comprising:

an image pickup part for performing still image pickup for shooting a subject image to generate a still image signal, and monitor-image pickup for successively generating monitor-image signals having a frame rate higher than that of the still image signal in time division;

a still image processing part for accepting the still image signal generated by the image pickup part and applying predetermined still image signal processing thereto;

a monitor-image processing part for accepting the monitor-image signals generated by the image pickup part and applying predetermined monitor signal processing thereto;

a control image processing part for accepting the monitor-image signals generated by the image pickup part and applying predetermined control signal processing thereto to extract control data;

a control part for accepting the control data output from the control image processing part and performing at least one control operation out of exposure control, focus control, and white balance control, based on the control data;

a display part for displaying the still image signal and the monitor-image signals in one of a juxtaposed fashion, and a nested fashion;

a first bus connected to the still image processing part and the monitor-image processing part, which transmits the still image signal and the monitor-image signals; and a second bus connected to the control image processing part and the control part, which transmits the control data, wherein:
    the monitor-image processing part and the still image processing part are configured to operate independently via the first bus,
    the control image processing part and the still image processing part are configured to operate independently via the first bus and the second bus,
    the monitor-image processing part performs the signal processing on the monitor-image signals successively generated, even when the still image signal is being signal-processed, and
    the control image processing part performs the signal processing on the monitor-image signals successively generated, even when the still image signal is being signal-processed.

3. The electronic camera according to claim 2, wherein:
the display part has a first memory region for storing the still image signal for monitor display use and a second memory region for storing the monitor-image signals, the first and second memory regions being independent from each other, and
the display part switches the memory region to be displayed on a monitor to replace display on the monitor.

4. An electronic camera comprising:
an image pickup part for performing still image pickup for shooting a subject image to generate a still image signal and monitor-image pickup for successively generating monitor-image signals having a frame rate higher than that of the still image signal in time division;

an image processing part for applying predetermined still image signal processing to the still image signal generated by the image pickup part and for applying predetermined monitor signal processing to the monitor-image signals generated by the image pickup part;

a control image processing part for accepting the monitor-image signals generated by the image pickup part and applying predetermined control signal processing thereto to extract control data;

a control part for accepting the control data output from the control image processing part and performing at least one control operation out of exposure control, focus control, and white balance control, based on the control data;

a first bus connected to the control image processing part, which transmits the control data; and a second bus connected to the image processing part, which transmits the still image signal, wherein:
    the control image processing part and the image processing part are configured to operate independently via the first bus and the second bus, and
    the control image processing part performs the signal processing on the monitor-image signals successively generated, even when the still image signal is being signal-processed.

5. The electronic camera according to claim 4, further comprising:
a display part for displaying the still image signal and the monitor-image signals in one of a juxtaposed fashion, a nested fashion, and a selective fashion.

6. The electronic camera according to claim 5, wherein
the display part has a first memory region for storing the still image signal for monitor display use and a second memory region for storing the monitor-image signals, the first and second memory regions being independent from each other, and
the display part switches the memory region to be displayed on a monitor to replace display on the monitor.

* * * * *